United States Patent
Rajan

(10) Patent No.: US 11,836,282 B2
(45) Date of Patent: Dec. 5, 2023

(54) METHOD AND DEVICE FOR SURFACING PHYSICAL ENVIRONMENT INTERACTIONS DURING SIMULATED REALITY SESSIONS

(71) Applicant: Apple Inc., Cupertino, CA (US)

(72) Inventor: Yohan Rajan, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/409,155

(22) Filed: Aug. 23, 2021

(65) Prior Publication Data

US 2021/0382546 A1 Dec. 9, 2021

Related U.S. Application Data

(63) Continuation of application No. 16/650,541, filed as application No. PCT/US2018/053214 on Sep. 27, 2018, now Pat. No. 11,132,053.
(Continued)

(51) Int. Cl.
*G06F 3/01* (2006.01)
*G02B 27/01* (2006.01)
(Continued)

(52) U.S. Cl.
CPC .......... *G06F 3/011* (2013.01); *G02B 27/0101* (2013.01); *G02B 27/0172* (2013.01);
(Continued)

(58) Field of Classification Search
CPC . G06F 3/011; G02B 27/0101; G02B 27/0172; G02B 2027/0123
See application file for complete search history.

(56) References Cited

U.S. PATENT DOCUMENTS

| | | | |
|---|---|---|---|
| 6,772,195 B1 * | 8/2004 | Hatlelid | G06F 3/04815 |
| | | | 709/224 |
| 8,839,150 B2 | 9/2014 | King et al. | |

(Continued)

FOREIGN PATENT DOCUMENTS

| | | |
|---|---|---|
| CN | 105378625 A | 3/2016 |
| CN | 106295581 A | 1/2017 |
| WO | 2013/056187 A1 | 4/2013 |

OTHER PUBLICATIONS

Chinese Office Action dated Aug. 30, 2021, CN Application No. 201880062341.8, pp. 1-9 (Including English Translation of Search Report).
(Continued)

*Primary Examiner* — Antonio A Caschera
(74) *Attorney, Agent, or Firm* — Fernando & Partners, LLP

(57) ABSTRACT

According to various implementations, a method is performed at an electronic device including one or more processors, non-transitory memory, and one or more displays. The method includes, while presenting a virtual environment, via the one or more displays, obtaining a request for interaction from an external source. The virtual environment includes a first plurality of available presentation regions and a second plurality of unavailable presentation regions. The method includes determining whether the request for interaction from the external source satisfies one or more interaction criteria. The method includes presenting, via the one or more displays, an avatar associated with the external source at one of the first plurality of available presentation regions within the virtual environment, in response to determining that the external source satisfies the one or more interaction criteria.

19 Claims, 9 Drawing Sheets

Related U.S. Application Data

(60) Provisional application No. 62/564,889, filed on Sep. 28, 2017.

(51) Int. Cl.
  *G06F 3/16* (2006.01)
  *G06V 20/20* (2022.01)

(52) U.S. Cl.
  CPC .............. *G06F 3/017* (2013.01); *G06F 3/167* (2013.01); *G06V 20/20* (2022.01); *G02B 2027/0123* (2013.01)

(56) References Cited

U.S. PATENT DOCUMENTS

| | | | |
|---|---|---|---|
| 9,300,612 B2 * | 3/2016 | Bates | ..................... H04N 7/157 |
| 10,019,962 B2 * | 7/2018 | Liu | ......................... G06F 3/011 |
| 10,930,082 B2 | 2/2021 | Singh | |
| 2002/0044152 A1 | 4/2002 | Abbott, III et al. | |
| 2006/0184891 A1 | 8/2006 | Parker et al. | |
| 2009/0259648 A1 * | 10/2009 | Bokor | ..................... G06F 3/011 |
| | | | 707/999.005 |
| 2015/0302869 A1 | 10/2015 | Tomlin et al. | |
| 2015/0325054 A1 | 11/2015 | Salter et al. | |
| 2017/0200310 A1 | 7/2017 | Kapinos et al. | |
| 2017/0294046 A1 | 10/2017 | Soda et al. | |

OTHER PUBLICATIONS

International Search Report and Written Opinion, International Application No. PCT/US2018/053214, dated Feb. 2, 2019, pp. 1-18.

* cited by examiner

METHOD AND DEVICE FOR SURFACING PHYSICAL ENVIRONMENT INTERACTIONS DURING SIMULATED REALITY SESSIONS

CROSS-REFERENCE TO RELATED APPLICATIONS

This application is a continuation application of U.S. Nonprovisional application Ser. No. 16/650,541, filed on Mar. 25, 2020, which is the national stage entry of Intl. Patent App. No. PCT/US2018/053214, filed on Sep. 27, 2018, which claims priority to U.S. Provisional App. No. 62/564,889, filed on Sep. 28, 2017, all of which are hereby incorporated by reference in their entirety.

TECHNICAL FIELD

The present disclosure generally relates to simulated reality (SR), and in particular, to systems, methods, and devices for surfacing physical environment interactions while experiencing SR content.

BACKGROUND

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
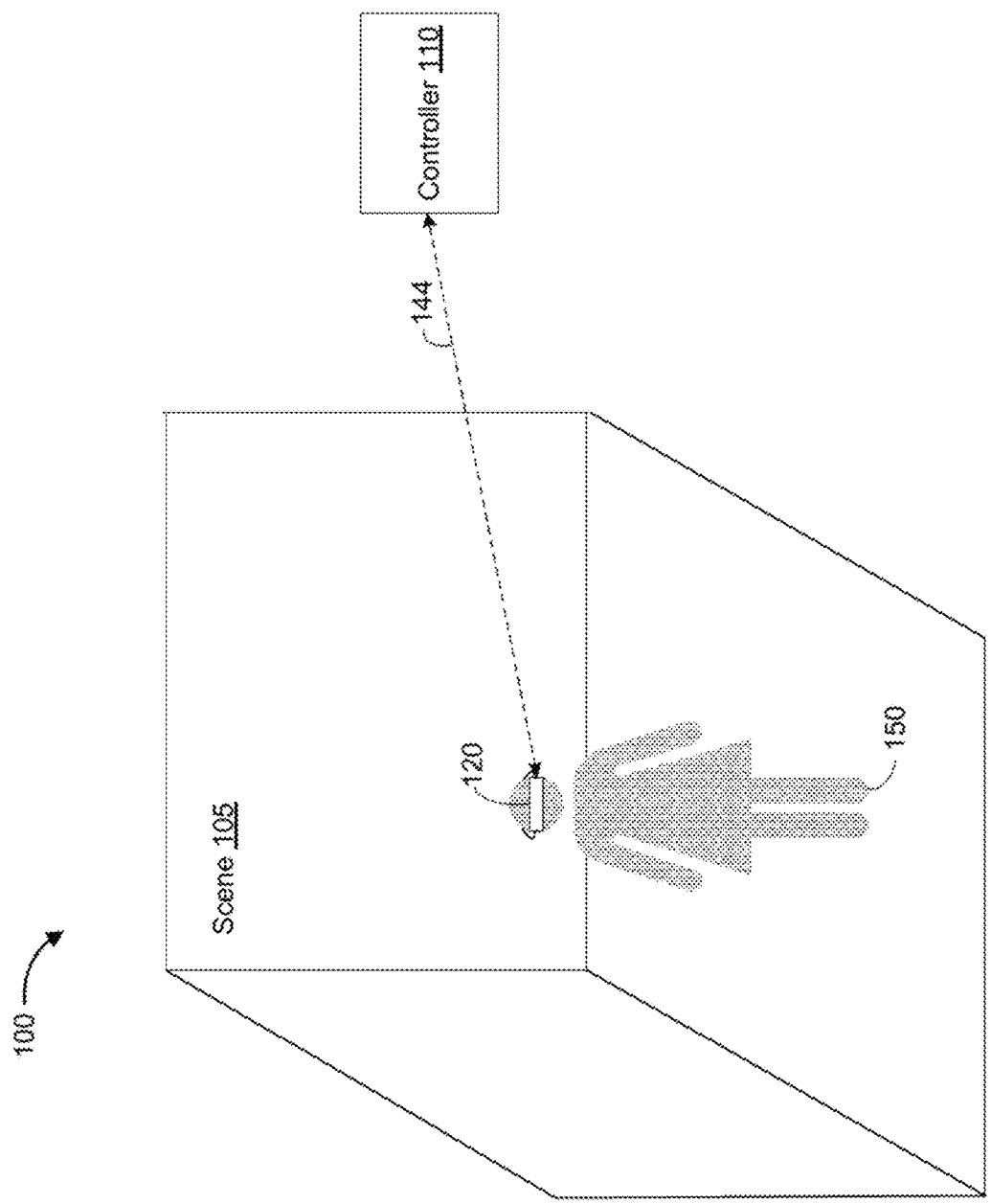
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for surfacing physical environment interactions for a user who is experiencing simulated reality (SR). According to some embodiments, the method is performed at an electronic device provided to deliver SR content, the electronic device including one or more processors, non-transitory memory, and one or more displays. The method includes: displaying SR content, via the one or more displays; determining whether an object in a physical environment satisfies one or more interaction criteria; and changing display of the SR content from a first view to a second view, in response to determining that the object in the physical environment satisfies the one or more interaction criteria, wherein, in the first view, the object in the physical environment is occluded by the SR content, and wherein the second view reduces occlusion of the object in the physical environment by the SR content.

Various implementations disclosed herein include devices, systems, and methods for presenting avatars within a virtual environment in a permissioned and realistic manner. According to some embodiments, the method is performed at a head-mounted device (HMD) provided to deliver simulated reality (SR) content, the HMD including one or more processors, non-transitory memory, and one or more displays. The method includes: while presenting a virtual environment, via the one or more displays, obtaining a request for interaction from an external source, wherein the virtual environment includes a first plurality of available presentation regions and a second plurality of unavailable presentation regions; determining whether the request for interaction from the external source satisfies one or more interaction criteria; and presenting, via the one or more displays, an avatar associated with the external source at one of the plurality of available presentation regions within the virtual environment presented on the one or more displays, in response to determining that the external source satisfies the one or more interaction criteria.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In some implementations, a user experiencing simulated reality (SR) content may seem aloof to other people that wish to interact with the user (e.g., converse, greet, etc.) because the user is immersed with the SR content or the SR content occludes the other people. As such, the innovations described herein change the display of the SR content provided to a user in order to reduce line-of-sight occlusion of an object in a physical environment (e.g., a pet or second user) by the CSR content within a field-of-view of the user in response to determining that the object satisfies one or more interaction criteria.

As one example, a user may experience SR content by using a head-mounted device (HMD) that encloses the user's field-of-view and optionally allows the user to see at least a portion of his/her surroundings (e.g., an HMD with video pass-through). As another example, a user may experience SR content by wearing an HMD that allows the user to see at least a portion of his/her surroundings (e.g., an HMD with optical see-through).

In some implementations, while a first user experiences SR content within a virtual environment, an avatar of a second user that wishes to interact with the first user should enter the virtual environment in a permissioned and realistic manner (e.g., not half inside a wall or laying on a table). As such, in response to determining that an external source (e.g., the second user) requesting to interact with the user satisfies one or more interaction criteria, embodiments of the innovation described herein present an avatar associated with the external source at one of a plurality of available presentation regions within a virtual environment. In some implementations, the avatar associated with the external source is presented within the virtual environment according to one or more initialization criteria.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some implementations, the controller 110 is configured to manage and coordinate a simulated reality (SR) experience for a user 150. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server situated within the scene 105. In another example, the controller 110 is a remote server situated outside of the scene 105 (e.g., a cloud server, central server, etc.). In some implementations, the controller 110 is communicatively coupled with the HMD 120 via one or more wired or wireless communication channels 144 (e.g., BLUETOOTH, ZIGBEE, Institute of Electrical and Electronics Engineers (IEEE) 802.11x, IEEE 802.16x, IEEE 802.3x, etc.).

In some implementations, the HMD 120 is configured to present the SR experience to the user 150. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 presents the SR experience to the user 150 while the user 150 is virtually and/or physically present within the scene 105. In some implementations, while presenting the SR experience, the HMD 120 is configured to present the SR content and to enable optical see-through of at least a portion of the scene 105. In some implementations, while presenting the SR experience, the HMD 120 is configured to present the SR content and to enable video pass-through of at least a portion of the scene 105. In some implementations, while presenting the SR experience, the HMD 120 is configured to present the SR content that includes virtual content composited with at least a portion of the scene 105.

In some implementations, the user 150 wears the HMD 120 on his/her head. As such, the HMD 120 includes one or more displays provided to display the SR content. For example, the HMD 120 includes a display for each eye of the user 150. For example, the HMD 120 encloses the field-of-view of the user 150. In some implementations, the HMD 120 is replaced with an SR chamber, enclosure, or room configured to present SR content in which the user 150 does not wear the HMD 120.

Figure 2:
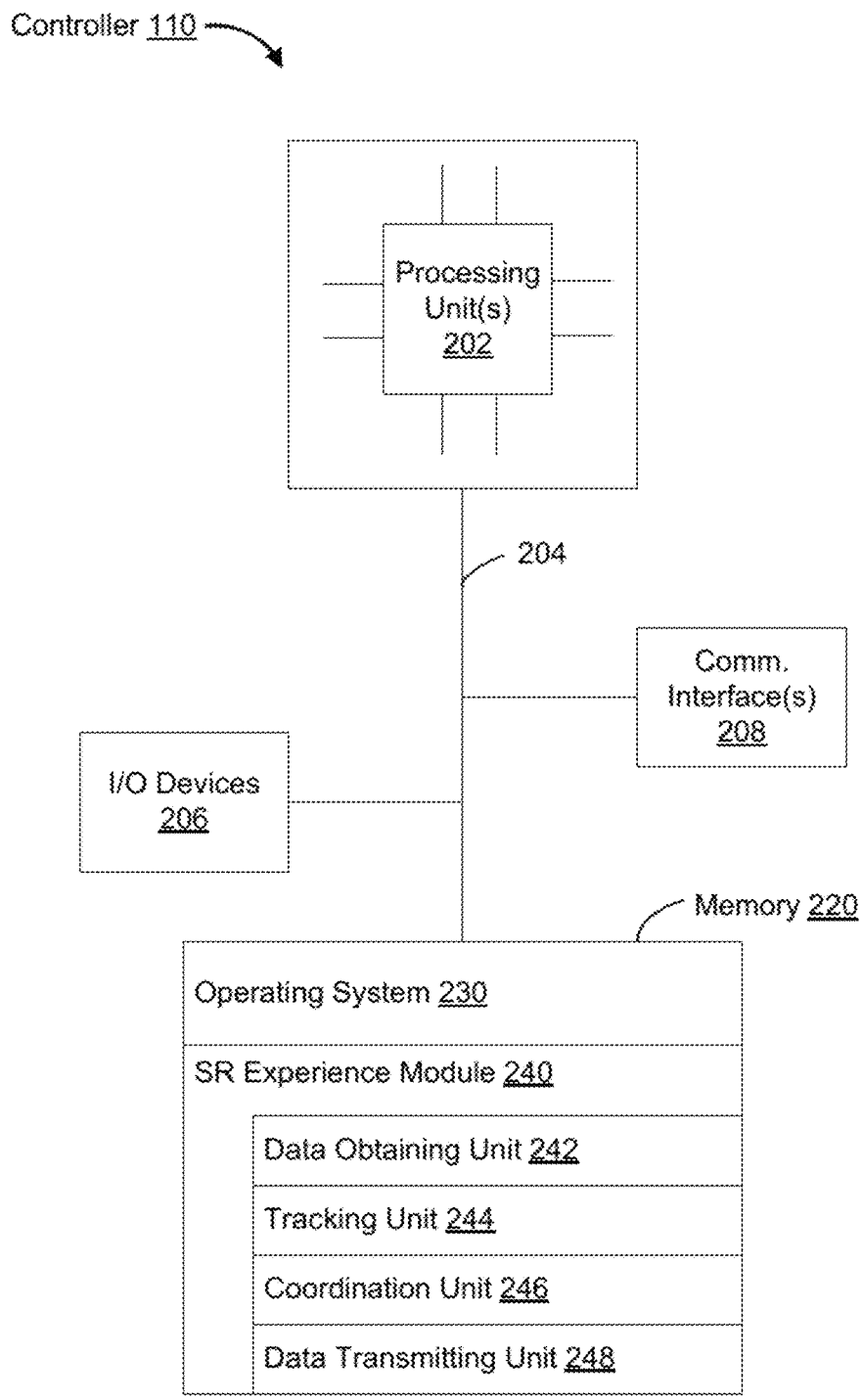
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a simulated reality (SR) experience module 240.

The operating system 230 includes procedures for handling various basic system services and for performing hardware dependent tasks. In some implementations, the SR experience module 240 is configured to manage and coordinate one or more SR experiences for one or more users (e.g., a single SR experience for one or more users, or multiple SR experiences for respective groups of one or more users). To that end, in various implementations, the SR experience module 240 includes a data obtaining unit 242, a tracking unit 244, a coordination unit 246, and a data transmitting unit 248.

In some implementations, the data obtaining unit 242 is configured to obtain data (e.g., presentation data, user interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the SR experience presented to the user 150 by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as a functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
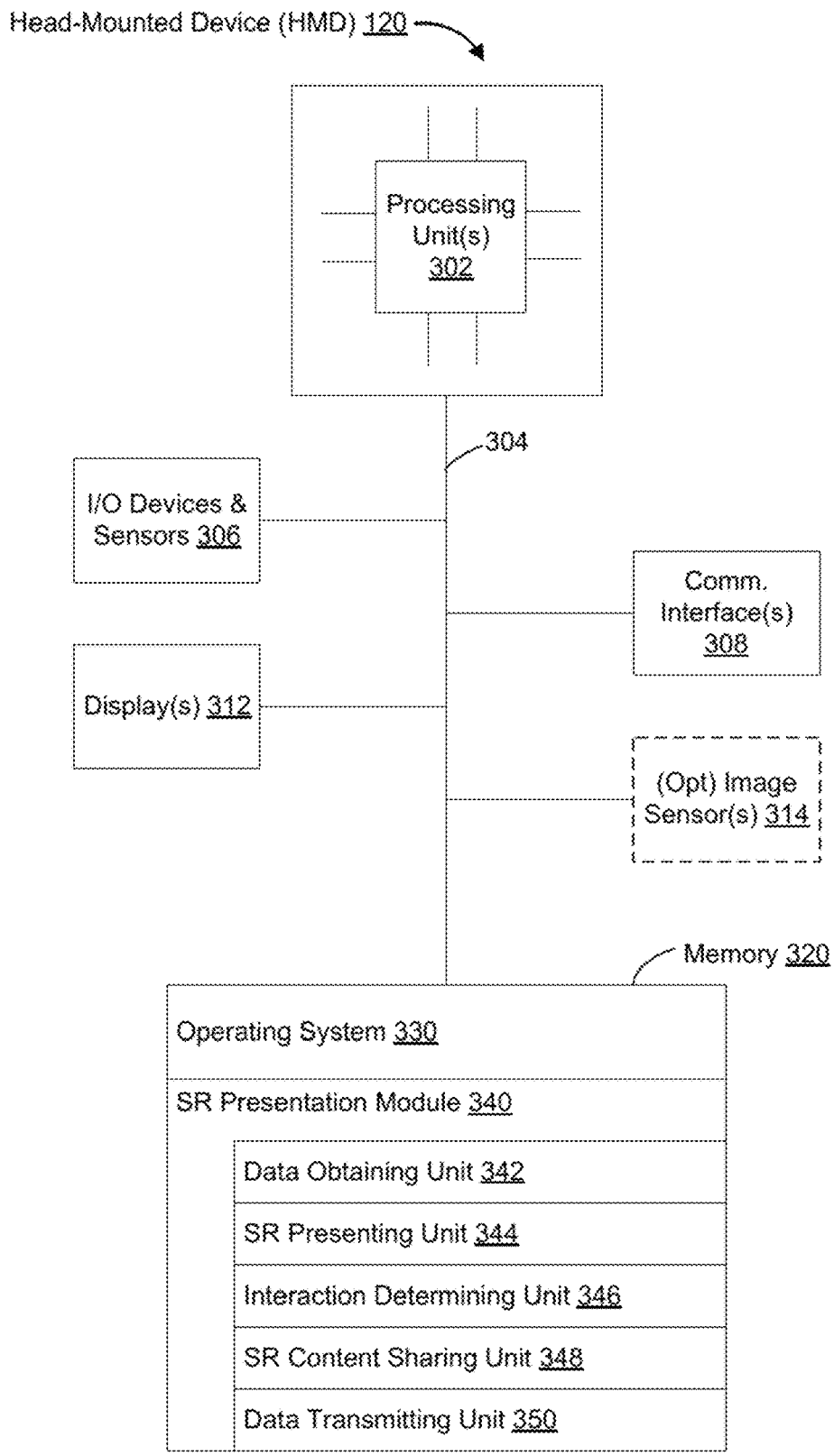
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more displays 312, one or more optional image sensors 314 (e.g., including one or more interior and/or one or more exterior facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light depth sensor, a time-of-flight depth sensor, or the like), and/or the like.

In some implementations, the one or more displays 312 are configured to present the SR experience to the user 150. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the HMD 120 includes a single SR display. In another example, the HMD 120 includes a display for each eye of the user 150. In some implementations, the one or more displays 312 are capable of presenting AR and VR content. In some implementations, the one or more displays 312 are capable of presenting SR content (e.g., AR, VR, MR, and/or AV). In some implementations, the one or more optional image sensors 314 correspond to RGB cameras (e.g., with a complimentary metal-oxide-semiconductor (CMOS) image sensors or a charge-coupled device (CCD) image sensors), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, and an SR presentation module 340.

The operating system 330 includes procedures for handling various basic system services and for performing hardware dependent tasks. In some implementations, the SR presentation module 340 is configured to present SR content to a user of the HMD 120 via the one or more displays 312. To that end, in various implementations, the SR presentation module 340 includes a data obtaining unit 342, an SR presenting unit 344, an interaction determining unit 346, an SR content sharing unit 348, and a data transmitting unit 350.

In some implementations, the data obtaining unit 342 is configured to obtain data (e.g., presentation data, user interaction data, sensor data, location data, etc.) from at least the controller 110. To that end, in various implementations, the data obtaining unit 342 includes instructions and/or logic therefor, and heuristics and metadata therefor.

In some implementations, the SR presenting unit 344 is configured to present SR content via the one or more displays 312. To that end, in various implementations, the SR presenting unit 344 includes instructions and/or logic therefor, and heuristics and metadata therefor.

In some implementations, the interaction determining unit 346 is configured to determine whether an object (e.g., another human different from the user of the HMD 120, animal, robotic device, etc.) satisfies one or more interaction criteria, e.g., as described below with reference to block 5-3 in FIG. 5. The one or more interaction criteria include, for example, a spatial threshold, a temporal duration criterion, an audible criterion, a body language condition, and/or the like. In some implementations, the interaction determining unit 346 is configured to determine whether an external source (e.g., a second user or avatar associated therewith) satisfies one or more interaction criteria, e.g., as described below with reference to block 7-3 in FIG. 7. The one or more interaction criteria include, for example, a list (plurality) of approved users, sometimes referred to as a "whitelist" in colloquial language, a list (plurality) of rejected users, sometimes referred to as a "blacklist" in colloquial language, an invitation condition, a user limit, and/or the like. To that end, in various implementations, the interaction determining unit 346 includes instructions and/or logic therefor, and heuristics and metadata therefor.

In some implementations, the SR content sharing unit 348 is configured to detect a request to share SR content or initiate a multi-user SR session, e.g., as described below with reference to block 5-5 in FIG. 5. To that end, in various implementations, the SR content sharing unit 348 includes instructions and/or logic therefor, and heuristics and metadata therefor.

In some implementations, the data transmitting unit 350 is configured to transmit data (e.g., presentation data, location data, user interaction data, etc.) to at least the controller 110. To that end, in various implementations, the data transmitting unit 350 includes instructions and/or logic therefor, and heuristics and metadata therefor.

Although the data obtaining unit 342, the SR presenting unit 344, the interaction determining unit 346, the SR content sharing unit 348, and the data transmitting unit 350 are shown as residing on a single device (e.g., the HMD 120), it should be understood that in other implementations, any combination of the data obtaining unit 342, the SR presenting unit 344, the interaction determining unit 346, the SR content sharing unit 348, and the data transmitting unit 350 may be located in separate computing devices.

Moreover, FIG. 3 is intended more as a functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4A:
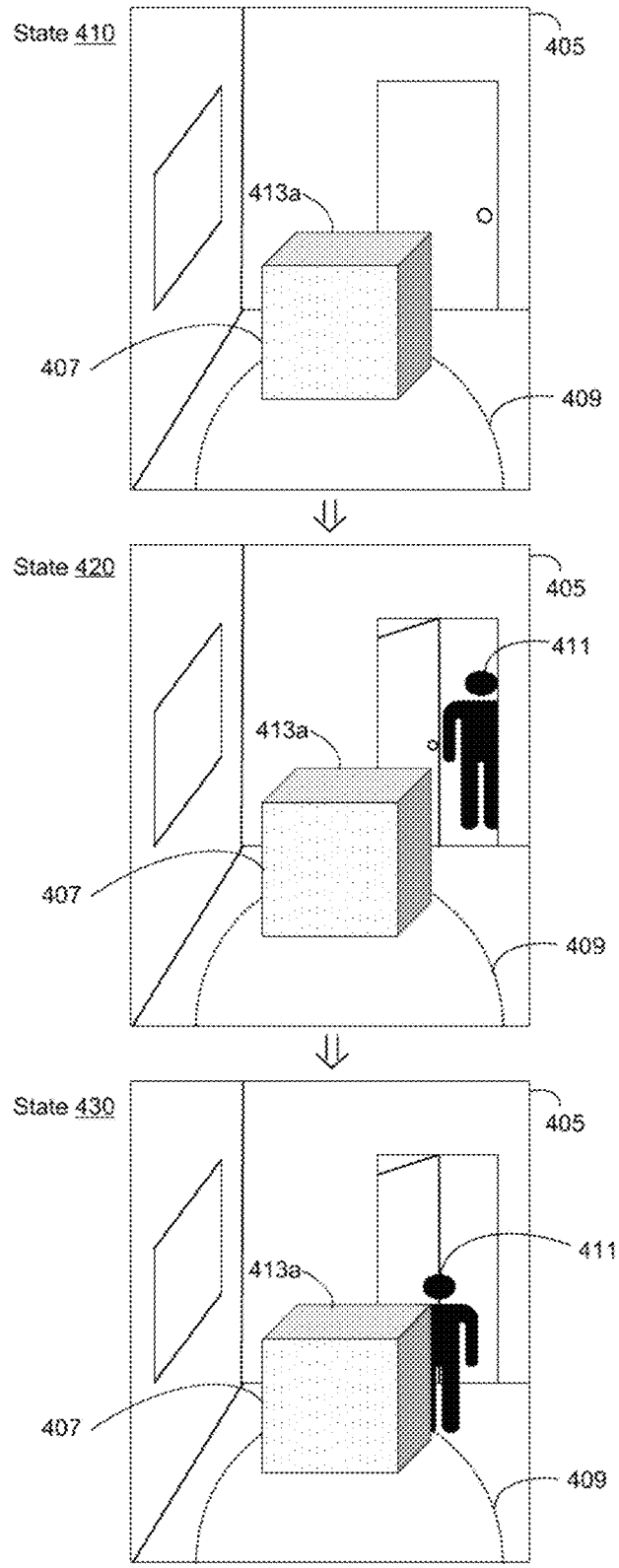
FIGS. 4A-4B illustrate an example scenario related to handling simulated reality (SR) content in response to detecting an interaction in accordance with some implementations.
Figure 4B:
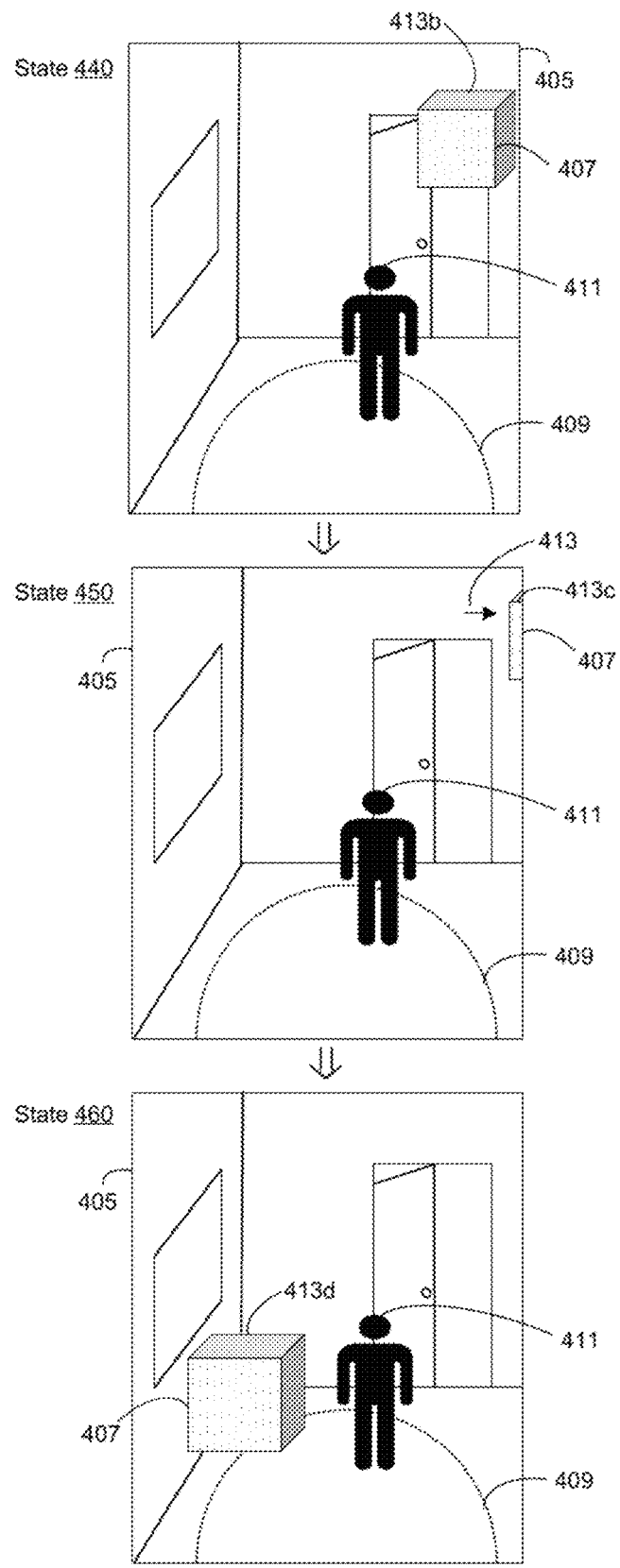

FIGS. 4A-4B illustrate example scenario 400 related to handling SR content in response to detecting an interaction in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the device (e.g., the HMD 120 in FIGS. 1 and 3) presents a scene 405 (e.g., an SR experience) to the user of the device (e.g., via the one or more displays 312 in FIG. 3). For example, the scene 405 corresponds to a physical environment. In another example, the scene 405 corresponds to a virtual environment. As such, the example scenario 400 shown in FIGS. 4A-4B is shown from the perspective of the user of the device (e.g., the first user).

As shown in state 410 of the example scenario 400, the device (e.g., the HMD 120 in FIG. 3) presents SR content 407 at position 413a to the user of the device. For example, the SR content 407 corresponds to an SR experience associated with learning, gaming, social media, content creation, or the like. For example, the user of the device is able to manipulate the SR content 407 with gestural movements, voice commands, eye movements, and/or the like. As shown in state 410 of the example scenario 400, a spatial threshold 409 corresponds to a radial area encircling the user of the device representing his/her "personal space zone." According to some implementations, if another user (e.g., a second user) enters within the spatial threshold 409, the device detects a potential social interaction between the user of the device and the other user.

As shown in state 420 of the example scenario 400, a second user 411 enters the scene 405. As one example, the second user 411 physically enters the room in which the user of the device is located. In some implementations, the device (e.g., the HMD 120 in FIG. 3) presents the second user to the user of the device via optical see-through. For example, the device corresponds to AR glasses through which the user of the device is able to see the second user. In some implementations, the device (e.g., the HMD 120 in FIG. 3) presents the second user to the user of the device via video pass-through. For example, the device corresponds to an HMD that encloses the field-of-view of the user. In this example, the device presents the second user (e.g., via the one or more displays 312 in FIG. 3) to the user of the device by presenting at least a portion of an image/video feed from an external facing image sensor (or camera), such as the one or more optional image sensors 314 in FIG. 3, that has the second user in its field-of-view.

As another example, an avatar associated with the second user 411 enters a virtual environment in which an avatar of the user of the device is located. In some implementations, the device (e.g., the HMD 120 in FIG. 3) presents the avatar of the second user (e.g., via the one or more displays 312 in FIG. 3) to the user of the device.

As shown in state 430 of the example scenario 400, the second user 411 enters the spatial threshold 409 of the user of the device. As shown in state 440 of the example scenario 400, the device (e.g., the HMD 120 in FIG. 3) moves the SR content 407 to position 413b in order to reduce line-of-sight occlusion of the second user 411 caused by the SR content 407 in response to detecting the second user 411 within the spatial threshold 409. As such, the device moves the SR content 407 from position 413a to position 413b in order to reduce line-of-sight occlusion caused by the SR content 407 so that the user of the device may have an unobstructed social interaction with the second user 411. Although the SR content 407 is moved to the upper-right corner of the scene 405, one of ordinary skill in the art will appreciate that the SR content 407 may be moved to any location(s) that reduce line-of-sight occlusion in various other implementations.

As shown in state 450 of the example scenario 400, the device (e.g., the HMD 120 in FIG. 3) moves the SR content 407 to position 413c in order to further reduce line-of-sight occlusion of the second user 411 caused by the SR content 407. As shown in state 450, the device (e.g., the HMD 120 in FIG. 3) also displays an indicator 413 (e.g., an arrow, text, etc.) as a reminder to the user of the device that the SR content 407 is still accessible.

As one example, the device (e.g., the HMD 120 in FIG. 3) moves the SR content 407 to position 413b (e.g., shown in state 440) in response to detecting the second user 411 within the spatial threshold 409 of the user of the device. Continuing with this example, the device (e.g., the HMD 120 in FIG. 3) moves the SR content 407 to position 413c (e.g., shown in state 450) in response to detecting the second user 411 has stayed within the spatial threshold 409 of the user of the device for at least a predetermined temporal duration (e.g., for at least 5 seconds). As such, for example, the device (e.g., the HMD 120 in FIG. 3) moves the SR content 407 to position 413b (e.g., shown in state 440) for short interruptions, and, later, the device (e.g., the HMD 120 in FIG. 3) moves the SR content 407 to position 413c (e.g., shown in state 450) when the short interruption has turned into, for example, a prolonged social interaction or an involved conversation.

As shown in state 460 of the example scenario 400, the device (e.g., the HMD 120 in FIG. 3) moves the SR content 407 to position 413d in response to detecting a request to share the SR content 407 with the second user 411. According to some implementations, the first or second user requests the initiation of a multi-user SR session, where SR content can be mutually viewed and manipulated by the user of the device and the second user. As such, for example, the SR content 407 is moved to the position 413d which reduces lines-of-sight of occlusion between the user of the device and the second user 411 and also places the SR content 407 within the field-of-view of the second user 411. As such, the SR content is moved to a location 413d that is mutually viewable by the user of the device and the second user.

Figure 5:
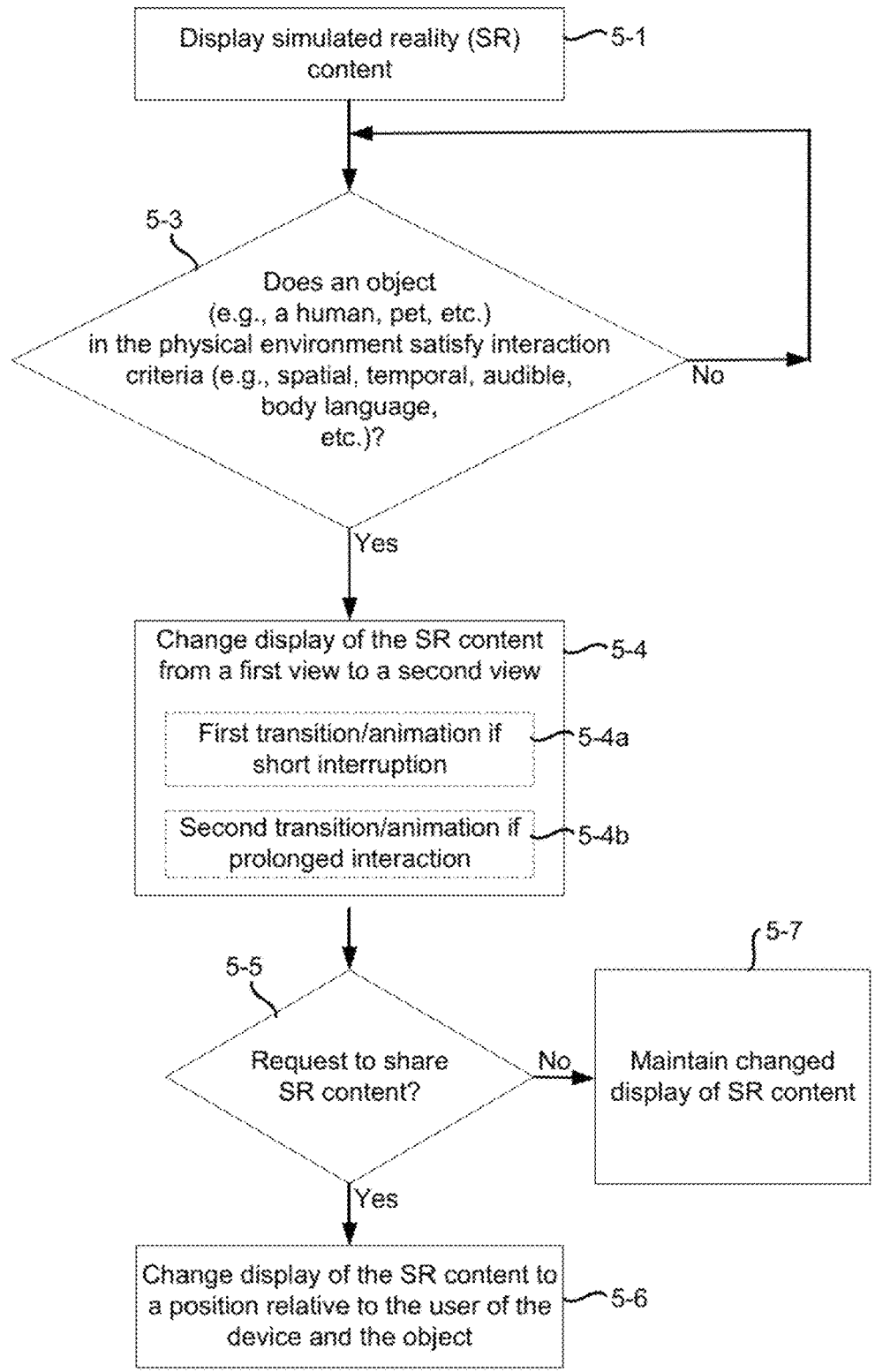
FIG. 5 is a flowchart representation of a method of handling SR content in response to detecting an interaction in accordance with some implementations.

FIG. 5 is a flowchart representation of a method 500 of handling SR content in response to detecting an interaction in accordance with some implementations. In various implementations, the method 500 is performed by a device with one or more processors, non-transitory memory, and one or more displays (e.g., the HMD 120 in FIGS. 1 and 3). In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 5-1, the method 500 includes displaying SR content (e.g., to a user of the device—the first user). For example, with reference to FIGS. 3 and 4A-4B, the HMD 120 or a component thereof (e.g., the SR presenting unit 344) presents, via the one or more displays 312, the SR content 407 to the user of the HMD 120 in state 410. As one example, the first user is viewing an AR model while in his/her physical office at work before being approached by a co-worker (e.g., a second user). As another example, the first user is viewing VR content within a virtual environment before being approached by an avatar associated with a second user. According to some implementations, the device rotates, manipulates, dismisses, shares, etc. the SR content in response to detecting gestural movements, voice commands, eye movements, or the like by the first user. In some implementations, while displaying the SR content, the device (e.g., the HMD 120 FIG. 3) presents, via an external presentation device, a visual indicator (e.g., to the second user and other users) indicating that the HMD is displaying SR content to the first user (e.g., external facing LEDs, external facing scrolling ticker, external facing display, etc. indicating a do-not-disturb (DND) or busy mode).

In some implementations, the device detects an object (e.g., another human different from the user of the device, animal, robotic device, etc.) within the physical/virtual environment. For example, with reference to FIGS. 3 and 4A-4B, the HMD 120 or a component thereof (e.g., the interaction determining unit 346) detects the second user 411 in states 420 and 430. As one example, the second user 411 enters the physical room in which the user of the HMD 120 is located. As another example, an avatar associated with the second user 411 enters a virtual environment in which an avatar of the user of the HMD 120 is located. In some implementations, the HMD 120 presents the second user to the first user via optical see-through if the second user is local to the first user (e.g., the HMD 120 corresponds to a non-enclosed HMD such as AR glasses). In some implementations, the HMD 120 presents the second user to the first user via video pass-through if the second user is local to the first user (e.g., the HMD 120 corresponds to an enclosed HMD). In some implementations, the HMD 120 presents the avatar of second user to the first user via video emulation if the second user is in a VR session.

As represented by block 5-3, the method 500 includes determining whether an object (e.g., another human different from the user of the device, animal, robotic device, etc.) in the physical environment satisfies one or more interaction criteria. For example, with reference to FIGS. 3 and 4A-4B, the HMD 120 or a component thereof (e.g., the interaction determining unit 346) detects the second user 411 within the spatial threshold 409. For example, the device (e.g., the HMD 120 in FIG. 3) determines whether the one or more interaction criteria are satisfied based on information obtained (e.g., collected, received, or retrieved) from one or more sensors of device (e.g., the one or more I/O devices and sensors 306 in FIG. 3 and/or the one or more image sensors 314 in FIG. 3) and/or one or more remote sensors associated with the physical environment (e.g., image sensors, infrared sensors, audio sensors, etc. within the physical environment). For example, the first user has the ability to set and/or modify the one or more interaction criteria associated with his/her personal account or profile.

In some implementations, the one or more interaction criteria correspond to one of a permission criterion, a spatial threshold (or radius) criterion relative to the HMD 120 or the user of the HMD 120, a temporal duration criterion, an audible criterion, a body language condition, and/or the like. In some embodiments, during a device configuration process, the user of the device provides his/her name. In some embodiments, during a device configuration process, the user of the device provides an audio sample.

If the object satisfies the one or more interaction criteria, the method 500 continues to block 5-4. If the second user does not satisfy the one or more interaction criteria, the method 500 continues to block 5-3. In some implementations, the method 500 includes maintaining display of the SR content in response to determining that the object does not satisfy the one or more interaction criteria.

In some implementations, the object satisfies the permission criterion among the one or more interaction criteria when the object (e.g., a second user, animal, robotic device, etc.) is included in a first predetermined list of users (e.g., a plurality of approved of users, sometimes referred to as a "whitelist" in colloquial language). In some implementations, object satisfies the permission criterion among the one or more interaction criteria when the object (e.g., a second user, animal, robotic device, etc.) is not included on a second predetermined list of users (e.g., a plurality of disapproved users, sometimes referred to as a "blacklist" in colloquial language).

In some implementations, the object satisfies the spatial threshold criterion among the one or more interaction criteria when the object (e.g., a second user, animal, robotic device, etc.) is within a predetermined spatial threshold (e.g., within an N meter radius) relative to the user of the device (e.g., virtually or physically). In some implementations, the object satisfies the temporal duration criterion among the one or more interaction criteria when the object (e.g., a second user, animal, robotic device, etc.) remains within the field-of-view of the first user for a predetermined temporal duration (e.g., M seconds). In some implementations, the object satisfies the one or more interaction criteria when the object (e.g., a second user, animal, robotic device, etc.) is within the predetermined spatial threshold relative to the user of the device for the predetermined temporal duration.

In some implementations, the device (e.g., the HMD 120 in FIG. 3) obtains, via one or more microphones (e.g., the one or more I/O devices and sensors 306 in FIG. 3), audio data from the object, and the object (e.g., a second user, animal, robotic device, etc.) satisfies the audible criterion among the one or more interaction criteria when the audio data includes at least one of a set of predefined keywords (e.g., the name of the user of the device, a greeting or salutation, an interjection, etc.). In some implementations, the device (e.g., the HMD 120 in FIG. 3) obtains, via one or more microphones (e.g., the one or more I/O devices and sensors 306 in FIG. 3), audio data from the user of the device, and the object (e.g., a second user, animal, robotic device, etc.) satisfies the audible criterion among the one or more interaction criteria when the audio data includes at least one of a set of predefined keywords (e.g., the name of the object, a greeting or salutation, an interjection, etc.).

In some implementations, the device (e.g., the HMD 120 in FIG. 3) obtains, via one or more microphones (e.g., the one or more I/O devices and sensors 306 in FIG. 3), audio data from the object, and the object (e.g., a second user, animal, robotic device, etc.) satisfies the audible criterion among the one or more interaction criteria when the directionality of the audio data indicates that the object is speaking at or towards the user of the device. For example, the device determines that the audio data does not match the user of the device based on a stored audio sample, and the device determines directionality of the audio data using a microphone array and spatial multiplexing or the like techniques. In some implementations, the device (e.g., the HMD 120 in FIG. 3) obtains, via one or more microphones (e.g., the one or more I/O devices and sensors 306 in FIG. 3), audio data from the user of the device, and wherein the object (e.g., a second user, animal, robotic device, etc.) satisfies the audible criterion among the one or more interaction criteria when the directionality of the audio data indicates that the user of the device is speaking at or towards the object. For example, the device determines that the audio data matches the user of the device based on a stored audio sample, and the device determines directionality of the audio data using a microphone array and spatial multiplexing or the like techniques.

In some implementations, the device (e.g., the HMD 120 in FIG. 3) detects, via one or more sensors (e.g., the one or more optional image sensors 314, or the one or more I/O devices and sensors 306 in FIG. 3), a movement gesture by the object, and the object (e.g., a second user, animal, robotic device, etc.) satisfies the body language criterion among the one or more interaction criteria when the directionality of the movement gesture indicates that the object is gesturing at or towards the user of the device and the movement gesture corresponds to at least one of a set of predefined gestures (e.g., a pointing gesture, hand waving gesture, winking gesture, etc.). In some implementations, the device (e.g., the HMD 120 in FIG. 3) detects, via one or more sensors (e.g., the one or more optional image sensors 314, or the one or more I/O devices and sensors 306 in FIG. 3), a movement gesture by the user of the device, and the object satisfies the body language criterion among the one or more interaction criteria when the directionality of the movement gesture indicates that the user of the device is gesturing at or towards the object (e.g., a second user, animal, robotic device, etc.) and the movement gesture corresponds to at least one of a set of predefined gestures (e.g., a pointing gesture, hand waving gesture, winking gesture, etc.).

In some implementations, the object satisfies the one or more interaction criteria when the object satisfies at least one of the one or more interaction criteria. In some implementations, the object satisfies the one or more interaction criteria when the object satisfies a set of active interaction criteria (e.g., the user of the device manually configures the set of active interaction criteria). In some implementations, the object satisfies the one or more interaction criteria when the object satisfies two or more of the interaction criteria.

As represented by block 5-4, the method 500 includes changing display of the SR content from a first view to a second view. In some implementations, in the first view, the object in the physical environment is occluded by the SR content. In some implementations, the second view reduces occlusion of the object in the physical environment by the SR content. As such, from the perspective of the user of the device, the second view reduces the line-of-sight occlusion of the object (e.g., a second user, animal, robotic device, etc.) by the SR content.

For example, with reference to FIGS. 4A-4B, the HMD 120 or a component thereof (e.g., the SR presenting unit 344) moves the SR content 407 from position 413a (e.g., the first view) in states 410-430 to position 413b (e.g., the second view) in state 440 in order to reduce line-of-sight occlusion of the second user 411 caused by the SR content 407 in response to detecting the second user 411 within the spatial threshold 409 of the user of the HMD 120 in state 430. As such, according to some implementations, the device moves the SR content to a new location based on a position of the object relative the user of the device so that the SR content does not occlude a line-of-sight between the user of the device and the object.

In some implementations, the device moves the SR content to a predefined location such as an edge of the field-of-view of the user of the device. In some implementations, the device determines a best location to move the SR content based on the relative positions of the user of the device (or the device) and the object. In some implementations, the device changes an appearance of the SR content, such as its translucency, transparency, or size, so that the SR content does not occlude a line-of-sight between the user of the device and the object.

In some implementations, changing display of the SR content includes presenting a predefined animation provided to transition the SR content from a first state to a second state (e.g., increased transparency/decreased opacity, fade-out, etc.). In some implementations, changing display of the SR content includes removing display of the SR content from the field-of-view of the first user. In some implementations, the method 500 includes displaying a content indicator, via the one or more displays, indicating that the SR content has been removed from the field-of-view of the user of the device and that the SR content remains available.

In some implementations, as represented by block 5-4a, changing display of the SR content includes presenting/performing a first transition or animation if the interaction corresponds to a short interruption. In some implementations, if the satisfied interaction criteria indicate a short interruption, the device performs a first animation of/modification to the SR content such as leaving the SR content in place and fading-out the SR content for transient interruptions. In some implementations, as represented by block 5-4b, changing display of the SR content includes presenting/performing a second transition or animation if the interaction corresponds to a prolonged interaction. In some implementations, if the satisfied interaction criteria indicate an involved/long conversation/interaction between the user of the device and the object, the device performs a second animation of/modification to the SR content such as moving the SR content out of the first user's field-of-view.

As one example, the device (e.g., the HMD 120 in FIG. 3) moves the SR content 407 to position 413b (e.g., shown in state 440) in response to detecting the second user 411 within the spatial threshold 409 of the user of the device. Continuing with this example, the device (e.g., the HMD 120 in FIG. 3) moves the SR content 407 to position 413c (e.g., shown in state 450) in response to detecting the second user 411 has stayed within the spatial threshold 409 of the user of the device for at least a predetermined temporal duration. As such, for example, the device (e.g., the HMD 120 in FIG. 3) moves the SR content 407 to position 413b (e.g., shown in state 440) for short interruptions, and, later, the device (e.g., the HMD 120 in FIG. 3) moves the SR content 407 to position 413c (e.g., shown in state 450) when the short interruption has turned into, for example, a prolonged social interaction or an involved conversation that exceeds a time threshold.

As represented by block 5-5, the method 500 includes determining whether a request to share the SR content has been detected. For example, the request to share the SR content corresponds to a gestural movement, voice command, eye movement, or the like from the user of the device and/or the object (e.g., a second user, animal, robotic device, etc.). According to some implementations, the user of the device and/or the object requests the initiation of a multi-user SR session, where SR content can be mutually viewed and manipulated by the user of the device and/or the object.

If the request to share the SR content has been detected, the method 500 continues to block 5-6. If the request to share the SR content has not been detected, the method 500 continues to block 5-7.

As represented by block 5-6, the method 500 includes changing display of the SR content to a position relative to both the user of the device and the object. In some implementations, the SR content is moved to a position that is mutually viewable for the first and second users. For example, the SR content is moved to a position that is within the field of views of both the user of the device and the object. As such, for example, the SR content may be moved/manipulated by either the user of the device or the object. For example, at least one of the avatars associated with the user of the device and the object is moved in a virtual environment to position the SR content relative to positions of the avatars associated with the user of the device and the object. In some implementations, if a third user joins the SR session, the SR content is moved again to another position that is mutually viewable for by all users. According to some implementations, the device ends the multi-user SR content sharing experience in response to detecting a predefined gestural movement, voice command, eye movement, or the like from the user of the device and/or the object.

For example, with reference to FIGS. 4A-4B, the HMD 120 or a component thereof (e.g., the SR presenting unit 344) moves the SR content 407 to position 413d in response to detecting a request to share the SR content 407 with the second user 411. As such, for example, the SR content 407 is moved to the position 413d which reduces lines-of-sight of occlusion between the user of the device and the second user 411 and also places the SR content 407 within the field-of-view of the second user 411. As such, the SR content is moved to a location that is mutually viewable by the user of the device and the second user in response to the request to share the SR content with the second user.

As represented by block 5-7, the method 500 includes maintaining the current position of the SR content. For example, with reference to FIGS. 4A-4B, the HMD 120 or a component thereof (e.g., the SR presenting unit 344) maintains the SR content at the position 413b in state 440 or at the position 413c in state 450 if the sharing request is not detected.

Figure 6A:
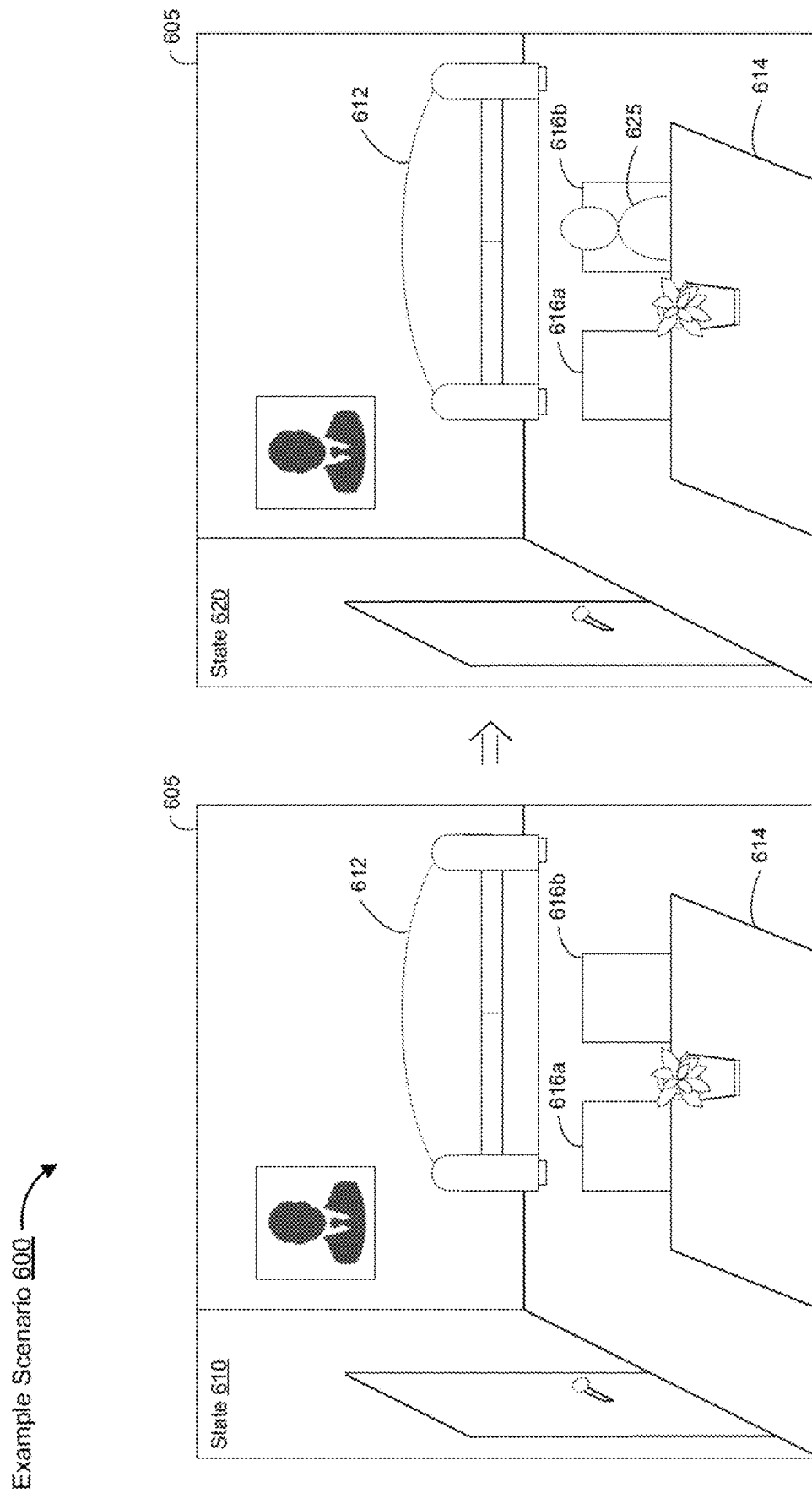
FIGS. 6A-6B illustrate example scenarios related to permissioned entrance into a virtual environment in accordance with some implementations.

FIG. 6A illustrates an example scenario 600 related to permissioned entrance into a virtual environment in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the device (e.g., the HMD 120 in FIG. 3) presents scene 605 (e.g., a VR experience) to the user of the device (e.g., via the one or more displays 312 in FIG. 3). For example, the scene 605 corresponds to a virtual environment or room. As such, the example scenario 600 shown in FIG. 6A is illustrated from the perspective of the user of the device (e.g., the first user).

As shown in state 610 of the example scenario 600, the device (e.g., the HMD 120 in FIG. 3) presents a virtual environment including a couch 612, a table 614, and chairs 616a and 616b. As such, for example, the user of the device is standing behind or seated at the table 614, and the scene 605 is shown from the perspective of the user of the device.

As shown in state 620 of the example scenario 600, the device (e.g., the HMD 120 in FIG. 3) presents an avatar 625 of the second user sitting in the chair 616b according to one or more initialization criteria in response to determining that the second user satisfies one or more interaction criteria (e.g., permission criteria). In some implementations, the one or more initialization criteria correspond to a ruleset for presenting other avatars to the user of the device. In some implementations, one of the one or more initialization criteria specifies a predefined distance threshold (e.g., a personal space radius criterion) outside of which the avatar of the second user may not be presented (e.g., other avatars are presented at least N meters from the avatar associated with the user of the device). In some implementations, one of the one or more initialization criteria specifies an entrance frequency criterion (e.g., allow one user to join the virtual environment every X seconds). In some implementations, one of the one or more initialization criteria specifies a posture criterion (e.g., other avatars are presented as sitting, standing, etc. within the virtual environment depending on the posture of the avatar of the user of the device). In some implementations, one of the one or more initialization criteria specifies an entrance animation (e.g., other avatars fade-into the virtual environment).

Figure 6B:
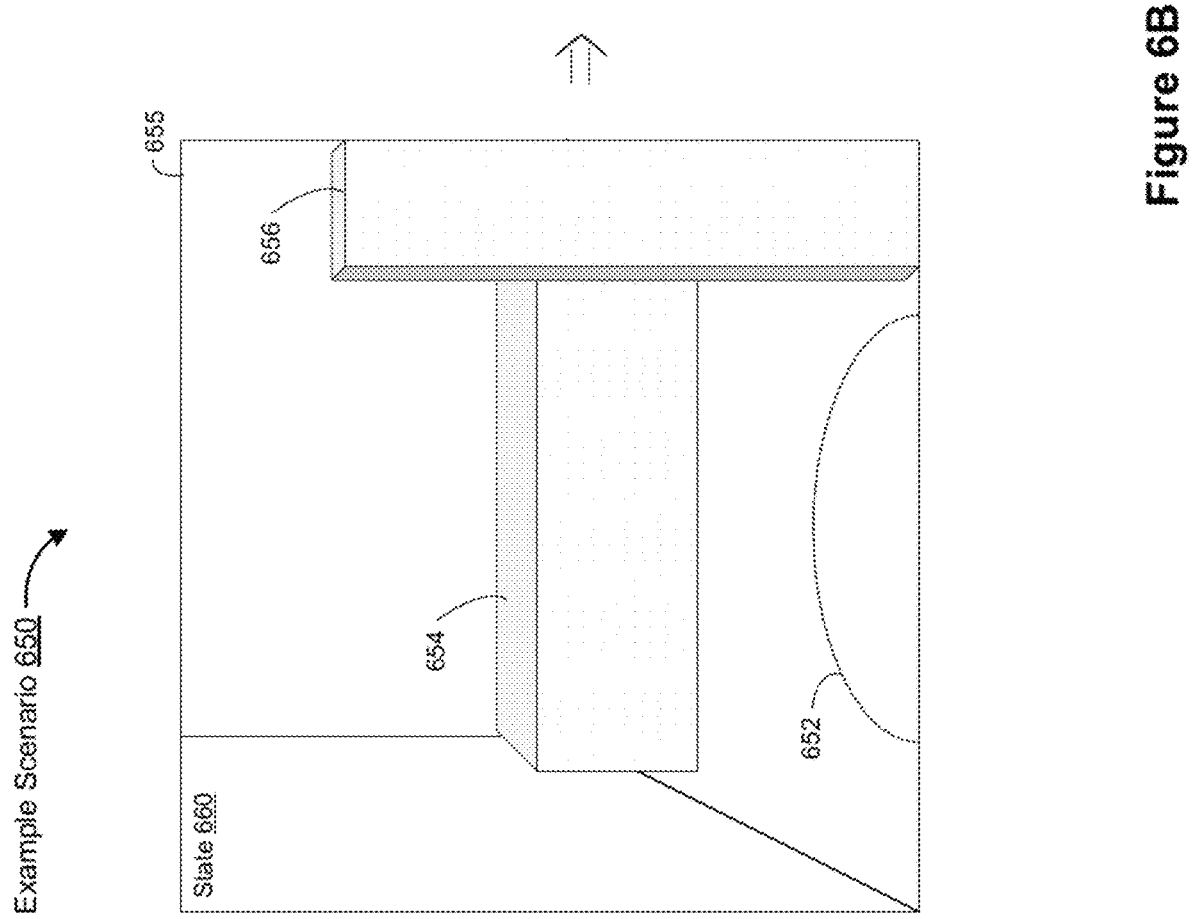

FIG. 6B illustrates an example scenario 650 related to permissioned entrance into a virtual environment in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the device (e.g., the HMD 120 in FIG. 3) presents scene 655 (e.g., a VR experience) to the user of the device (e.g., via the one or more displays 312 in FIG. 3). For example, the scene 655 corresponds to a virtual environment or room. As such, the example scenario 650 shown in FIG. 6B is illustrated from the perspective of the user of the device (e.g., the first user).

As shown in state 660 of the example scenario 650, the device (e.g., the HMD 120 in FIG. 3) presents a virtual environment including a predefined distance threshold 652 (e.g., a personal space radius criterion) outside of which the avatar of the second user may not be presented (e.g., other avatars are presented at least N meters from the avatar associated with user of the device) and unavailable presentation zones 654 and 656. For example, the unavailable presentation zones 654 and 656 correspond to volumetric regions of the virtual environment in which other avatars may not be presented. Continuing with this example, in some implementations, limbs of other avatars may be displayed in the unavailable presentation zones 654 and 656, but other portions of other avatars (e.g., torsos) may not be displayed. For example, the unavailable presentation zones 654 and 656 correspond to virtual furniture, virtual "do not occupy" zones selected by the first user, virtual "do not occupy" zones selected by the creator of the virtual environment, or the like.

As shown in state 670 of the example scenario 600, the device (e.g., the HMD 120 in FIG. 3) presents an avatar 665 of the second user standing at a location within the virtual environment that corresponds to a respective available presentation zone (e.g., not within the predefined distance threshold 652 and not within the unavailable presentation zones 654 and 656) according to one or more initialization criteria in response to determining that the second user satisfies one or more interaction criteria (e.g., permission criteria). In some implementations, the one or more initialization criteria correspond to a ruleset for presenting other avatars to the user of the device. In some implementations, one of the one or more initialization criteria specifies a predefined distance threshold (e.g., a personal space radius criterion) outside of which the avatar of the second user may not be presented (e.g., other avatars are presented at least N meters from the avatar associated with the user of the device). In some implementations, one of the one or more initialization criteria specifies an entrance frequency criterion (e.g., allow one user to join the virtual environment every X seconds). In some implementations, one of the one or more initialization criteria specifies a posture criterion (e.g., other avatars are presented as sitting, standing, etc. within the virtual environment depending on the posture of the avatar of the user of the device). In some implementations, one of the one or more initialization criteria specifies an entrance animation (e.g., other avatars fade-into the virtual environment).

Figure 7:
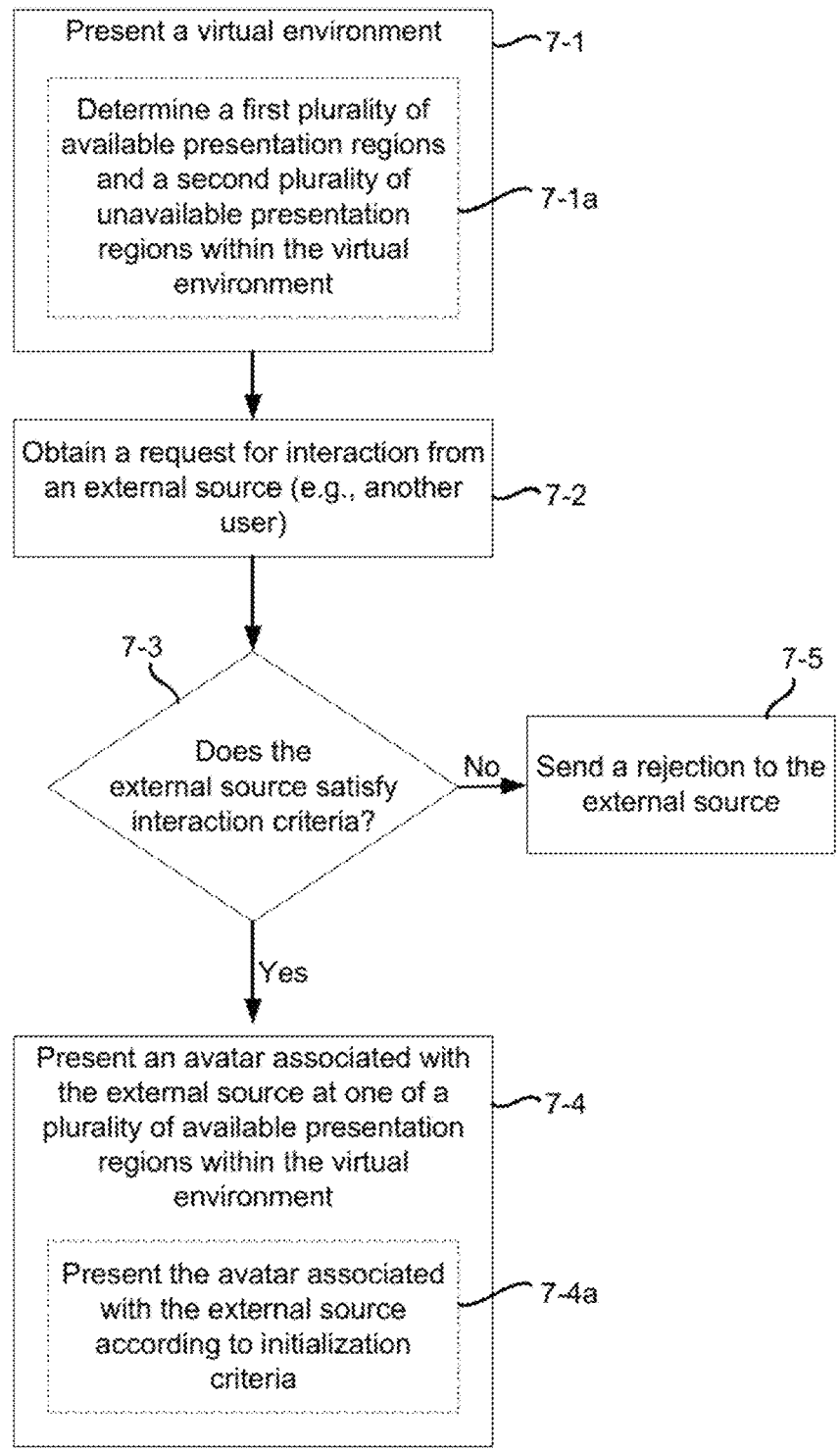
FIG. 7 is a flowchart representation of a method of permissioned entrance into a virtual environment in accordance with some implementations.

FIG. 7 is a flowchart representation of a method 700 of permissioned entrance into a virtual environment in accordance with some implementations. In various implementations, the method 700 is performed by a device with one or more processors, non-transitory memory, and one or more displays (e.g., the HMD 120 in FIGS. 1 and 3). In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 7-1, the method 700 includes presenting a virtual environment via the one or more displays (e.g., to a user of the device—the first user). For example, with reference to FIGS. 3 and 6A, the HMD 120 or a component thereof (e.g., the SR presenting unit 344) presents, via the one or more displays 312, the virtual environment associated with the scene 605 to the user of the HMD 120 (e.g., the first user).

As represented by block 7-1a, the method 700 includes determining a first plurality of available presentation regions and a second plurality of unavailable presentation regions within the virtual environment. As shown in FIG. 6B, for example, the predefined distance threshold 652 (e.g., a personal space radius) and the volumetric regions 654 and 656 are unavailable presentation regions. In some implementations, the first plurality of available presentation regions corresponds to areas within the virtual environment within which another virtual avatar may be displayed (e.g., unoccupied seats at a virtual table, and unoccluded and/or unoccupied floor space). In some implementations, the second plurality of unavailable presentation regions corresponds to areas within the virtual environment within which another virtual avatar may not be displayed (e.g., immutable areas or content, occupied seats at a virtual table, and occluded and/or occupied floor space or virtual furniture). In some implementations, portions of avatars such as hands may be presented in unavailable presentation region but not torsos, etc.

According to some implementations, the device determines the unavailable presentations zones based on the dimensions of the virtual environment, virtual content within the virtual environment (e.g., virtual furniture, etc.), the location of the avatar associated with the user of the device within the virtual environment (and the predefined distance threshold associated with the user of the device), and/or the like. According to some implementations, the user of the device selects which portions of the virtual environment are viewable by other users (e.g., gated sharing of virtual content). As such, the user of the device is able to choose which virtual content others can see within his/her virtual environment. For example, with reference to FIG. 6A, the virtual environment shown in the scene 605 includes VR content that may or may not be shared with the second user. In some implementations, the first plurality of available presentation regions and the second plurality of unavailable presentation regions corresponds to selectable content items, regions, or the like. As such, the device obtains an input from the first user that corresponds to a selection of at least one of the first plurality of available presentation regions or a selection of the second plurality of unavailable presentation regions. In other words, the first user selects the unavailable presentation zones. For example, the unavailable presentations zones correspond to virtual content that is not viewable by other users.

As represented by block 7-2, the method 700 includes obtaining a request for interaction from an external source (e.g., a second user). For example, with reference to FIG. 6A, the HMD 120 or a component thereof (e.g., the interaction determining unit 346) detects a request from the second user to interact with the first user (e.g., within a virtual environment associated with the first user, a virtual environment associated with the second user, a neutral virtual environment, or the like). For example, the request is obtained from a user detection module of the device when the second user approaches within a physical spatial threshold of the first user. In another example, the request is obtained from a user detection module of the device when an avatar associated with the second user approaches within virtual spatial threshold of the avatar associated with the first user. In another example, the request is obtained when the second user sends an interaction request to the first user. In yet another example, the request is obtained when the second user responds to an invitation from the first user.

In one example, the request for interaction from the external source (e.g., a second user) corresponds to a response to an invitation to enter the virtual environment from the user of the device. In another example, the request for interaction from the external source (e.g., a second user) corresponds to a query from the external source to enter the virtual environment. In yet another example, assuming that the external source (e.g., the second user) and the user of the device are physically nearby each other, the request for interaction from the external source corresponds to a gestural movement, audible request, eye movement, or the like from the external source.

As represented by block 7-3, the method 700 includes determining whether the external source satisfies one or more interaction criteria. For example, with reference to FIG. 3, the HMD 120 or a component thereof (e.g., the interaction determining unit 346), determines whether the external source (e.g., the second user) satisfies the one or more interaction criteria. In some implementations, the external source (e.g., the second user) satisfies the one or more interaction criteria when the external source satisfies at least one of the one or more interaction criteria. In some implementations, the external source (e.g., the second user) satisfies the one or more interaction criteria when the external source satisfies a set of active interaction criteria (e.g., the user of the device manually configures the set of active interaction criteria). In some implementations, the external source (e.g., the second user) satisfies the one or more interaction criteria when the external source satisfies two or more of the interaction criteria.

In some implementations, the external source satisfies the one or more interaction criteria when the external source is included on a first predetermined list of users (e.g., a plurality of approved of users, sometimes referred to as a "whitelist" in colloquial language). In some implementations, the external source satisfies the one or more interaction criteria when the external source is not included on a second predetermined list of users (e.g., a plurality of disapproved users, sometimes referred to as a "blacklist" in colloquial language). In some implementations, the external source satisfies the one or more interaction criteria when a user limit associated with the virtual environment has not been exceeded (e.g., Y users (or their avatars) at one time may be present within the virtual environment of the user of the device at a time).

In some implementations, the external source satisfies the one or more interaction criteria if the user of the device invited the external source to enter the virtual environment. In some implementations, the external source satisfies the one or more interaction criteria if the user of the device allows non-invited users to enter the virtual environment. In some implementations, the device obtains a request from the external source to enter the virtual environment. Thereafter, the device presents the request to the user of the device, and the second user satisfies the one or more interaction criteria if the user of the device accepts the request.

If the external source (e.g., the second user) does not satisfy the one or more interaction criteria, the method 700 continues to block 7-5. If the external source (e.g., the second user) satisfies the one or more interaction criteria, the method 700 continues to block 7-4.

As represented by block 7-5, the method 700 includes sending a rejection message to the external source. For example, with reference to FIG. 3, the HMD 120 or a component thereof (e.g., the data transmitting module 350), sends a rejection message to the external source (e.g., the second user) or an associated device.

As represented by block 7-4, the method 700 includes presenting an avatar associated with the external source (e.g., the second user) at one of a plurality of available presentation regions within the virtual environment. For example, with reference to FIGS. 3 and 6B, the HMD 120 or a component thereof (e.g., the SR presenting module 344) presents, via the one or more SR display 312, the avatar 665 of the second user standing at a location within the virtual environment that corresponds to a respective available presentation zone (e.g., not within the predefined distance threshold 652 and not within the unavailable presentation zones 654 and 656) according to one or more initialization criteria.

As represented by block 7-4a, the method 700 includes presenting the avatar associated with the external source according to one or more initialization criteria. In some implementations, the one or more initialization criteria correspond to a ruleset for presenting other avatars to the user of the device. According to some implementations, one of the one or more initialization criteria corresponds to a personal space radius criterion (e.g., a predefined distance threshold) outside of which the avatar associated with the external source (e.g., the second user) may not be presented (e.g., other avatars are presented at least N meters from the avatar associated with user of the device). According to some implementations, one of the one or more initialization criteria corresponds to a posture criterion (e.g., other avatars are presented as sitting, standing, etc. depending on the posture of the avatar associated with the user of the device). According to some implementations, one of the one or more initialization criteria corresponds an entrance frequency criterion (e.g., allow avatars associated with other users to join the virtual environment every X seconds). According to some implementations, one of the one or more initialization criteria corresponds to an entrance animation (e.g., other avatars fade-in to the virtual environment).

According to some implementations, the method 700 includes determining a virtual environment in which to present the avatars associated with the first and second users. In one example, the avatar of the second user is presented within a virtual environment associated with the user of the device. In another example, the avatar associated with the user of the device is presented within a virtual environment associated with the external source. In yet another example, the avatars associated with the first and second users are both presented in a neutral virtual environment. In yet another example, the avatar associated with the user of the device is presented within the virtual environment associated with the external source, and the avatar associated with the external source is presented within the virtual environment associated with the user of the device.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first user could be termed a second user, and, similarly, a second user could be termed a first user, which changing the meaning of the description, so long as all occurrences of the "first user" are renamed consistently and all occurrences of the "second user" are renamed consistently. The first user and the second user are both users, but they are not the same user.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device including one or more processors, a non-transitory memory, and one or more displays:
   determining an unavailable presentation region of a volumetric setting including and surrounding a user location in the volumetric setting;
   obtaining a request for interaction from an external source;
   determining whether the request for interaction from the external source satisfies one or more interaction criteria; and
   in response to determining that the external source satisfies the one or more interaction criteria, presenting, via the one or more displays, an avatar associated with the external source at an available presentation region of the volumetric setting outside the unavailable presentation region.

2. The method of claim 1, wherein the electronic device corresponds to a head-mountable device (HMD).

3. The method of claim 1, further comprising transmitting a rejection message to the external source in response to determining that the request for interaction from the external source does not satisfy the one or more interaction criteria.

4. The method of claim 1, wherein the request for interaction from the external source satisfies the one or more interaction criteria when the external source is included within a whitelist.

5. The method of claim 1, wherein the request for interaction from the external source satisfies the one or more interaction criteria when a user limit is not exceeded.

6. The method of claim 1, wherein the request for interaction from the external source satisfies the one or more interaction criteria when the external source was invited to interact.

7. The method of claim 1, wherein the request for interaction from the external source satisfies the one or more interaction criteria when non-invited users are allowed to interact.

8. The method of claim 1, further comprising:
   presenting the request for interaction via the one or more displays, wherein the request for interaction satisfies the one or more interaction criteria when the request for interaction is accepted.

9. The method of claim 1, wherein the avatar associated with the external source is presented according to one or more initialization criteria.

10. The method of claim 1, wherein the unavailable presentation region is a region within a predefined distance threshold from the user location.

11. The method of claim 1, wherein the available presentation region is at least a predetermined distance from the user location.

12. An electronic device comprising:
one or more processors;
a non-transitory memory;
one or more displays; and
one or more programs stored in the non-transitory memory, which, when executed by the one or more processors, cause the electronic device to perform operations including:
determining an unavailable presentation region of a volumetric setting including and surrounding a user location in the volumetric setting;
obtaining a request for interaction from an external source;
determining whether the request for interaction from the external source satisfies one or more interaction criteria; and
in response to determining that the external source satisfies the one or more interaction criteria, presenting, via the one or more displays, an avatar associated with the external source at an available presentation region of the volumetric setting outside the unavailable presentation region.

13. The electronic device of claim 12, wherein the one or more programs cause the electronic device to perform operations including transmitting a rejection message to the external source in response to determining that the request for interaction from the external source does not satisfy the one or more interaction criteria.

14. The electronic device of claim 12, wherein the request for interaction from the external source satisfies the one or more interaction criteria when the external source is included within a whitelist.

15. The electronic device of claim 12, wherein the request for interaction from the external source satisfies the one or more interaction criteria when a user limit is not exceeded.

16. The electronic device of claim 12, wherein the request for interaction from the external source satisfies the one or more interaction criteria when the external source was invited to interact.

17. The electronic device of claim 12, wherein the request for interaction from the external source satisfies the one or more interaction criteria when non-invited users are allowed to interact.

18. The electronic device of claim 12, wherein the one or more programs cause the electronic device to perform operations including:
presenting the request for interaction via the one or more displays, wherein the request for interaction satisfies the one or more interaction criteria when the request for interaction is accepted.

19. A non-transitory computer readable storage medium storing one or more programs, the one or more programs comprising instructions, which, when executed by an electronic device including one or more displays, cause the electronic device to:
determine an unavailable presentation region of a volumetric setting including and surrounding a user location in the volumetric setting;
obtain a request for interaction from an external source;
determine whether the request for interaction from the external source satisfies one or more interaction criteria; and
in response to determining that the external source satisfies the one or more interaction criteria, present, via the one or more displays, an avatar associated with the external source at an available presentation region of the volumetric setting outside the unavailable presentation region.

* * * * *